(12) United States Patent
Dai

(10) Patent No.: US 12,429,216 B2
(45) Date of Patent: Sep. 30, 2025

(54) TURBINE ENGINE FUEL INJECTOR ASSEMBLY WITH ANNULAR FUEL OUTLET

(71) Applicant: Raytheon Technologies Corporation, Farmington, CT (US)

(72) Inventor: Zhongtao Dai, West Hartford, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 18/113,446

(22) Filed: Feb. 23, 2023

(65) Prior Publication Data

US 2024/0288159 A1 Aug. 29, 2024

(51) Int. Cl.
*F23D 11/00* (2006.01)
*F02C 7/232* (2006.01)
*F23D 11/38* (2006.01)
*F23R 3/28* (2006.01)

(52) U.S. Cl.
CPC ............ *F23D 11/383* (2013.01); *F02C 7/232* (2013.01); *F23R 3/28* (2013.01); *F05D 2220/32* (2013.01); *F05D 2240/36* (2013.01)

(58) Field of Classification Search
None
See application file for complete search history.

(56) References Cited

U.S. PATENT DOCUMENTS

| | | | |
|---|---|---|---|
| 3,945,574 A | 3/1976 | Polnauer | |
| 6,279,323 B1 * | 8/2001 | Monty | F23R 3/14 60/752 |
| 6,367,262 B1 * | 4/2002 | Mongia | F23R 3/286 60/748 |
| 6,547,163 B1 * | 4/2003 | Mansour | B05B 1/3421 239/404 |
| 6,895,755 B2 | 5/2005 | Steinthorsson | |
| 8,387,391 B2 | 3/2013 | Patel | |
| 8,726,668 B2 | 5/2014 | Patel | |
| 2004/0255589 A1 * | 12/2004 | Yoshida | F23R 3/286 60/746 |
| 2005/0115244 A1 * | 6/2005 | Griffin | F23R 3/286 60/737 |

(Continued)

OTHER PUBLICATIONS

EP Search Report for EP Patent Application No. 24159224.5 dated Jun. 17, 2024.

(Continued)

*Primary Examiner* — Edwin Kang
(74) *Attorney, Agent, or Firm* — Getz Balich LLC

(57) ABSTRACT

An apparatus is provided for a turbine engine. This turbine engine apparatus includes a fuel injector nozzle extending axially along an axis to a nozzle tip. The fuel injector nozzle includes an inner fuel passage and an outer fuel passage. The inner fuel passage extends axially within the fuel injector nozzle to an inner passage outlet at the nozzle tip. The inner passage outlet is formed by an inner divergent surface. The inner divergent surface is angularly offset from the axis by a first acute angle. The outer fuel passage extends axially within the fuel injector nozzle to an annular outer passage outlet at the nozzle tip. The annular outer passage outlet is formed by an outer divergent surface. The outer divergent surface is angularly offset from the axis by a second acute angle that is greater than the first acute angle.

19 Claims, 8 Drawing Sheets

(56) References Cited

U.S. PATENT DOCUMENTS

| | | | |
|---|---|---|---|
| 2009/0255262 A1* | 10/2009 | McMasters | F23R 3/34 60/742 |
| 2010/0186417 A1* | 7/2010 | Blomeyer | F23R 3/283 239/398 |
| 2010/0263382 A1* | 10/2010 | Mancini | F23R 3/14 60/742 |
| 2012/0047897 A1* | 3/2012 | Hirata | F23R 3/48 60/737 |
| 2012/0181355 A1* | 7/2012 | Corry | F23R 3/28 239/436 |
| 2012/0305673 A1* | 12/2012 | Matsuyama | F23R 3/286 239/533.2 |
| 2014/0083100 A1 | 3/2014 | Cunha | |
| 2014/0144144 A1* | 5/2014 | Hirata | F23R 3/286 60/738 |
| 2014/0202161 A1* | 7/2014 | Yuasa | F23R 3/14 60/746 |
| 2015/0082770 A1* | 3/2015 | Igarashi | F23R 3/34 60/737 |
| 2017/0009995 A1 | 1/2017 | Witham | |
| 2017/0122212 A1 | 5/2017 | Cadman | |
| 2017/0248318 A1* | 8/2017 | Kulkarni | F23R 3/46 |
| 2018/0372319 A1* | 12/2018 | Matsuyama | F23D 11/107 |
| 2019/0032559 A1* | 1/2019 | Dai | F23R 3/286 |
| 2019/0063753 A1 | 2/2019 | Stevens | |
| 2019/0203929 A1 | 7/2019 | Benjamin | |
| 2022/0356846 A1 | 11/2022 | Overman | |

OTHER PUBLICATIONS

EP Office Action for EP Patent Application No. 24159224.5 dated Apr. 22, 2025.

* cited by examiner

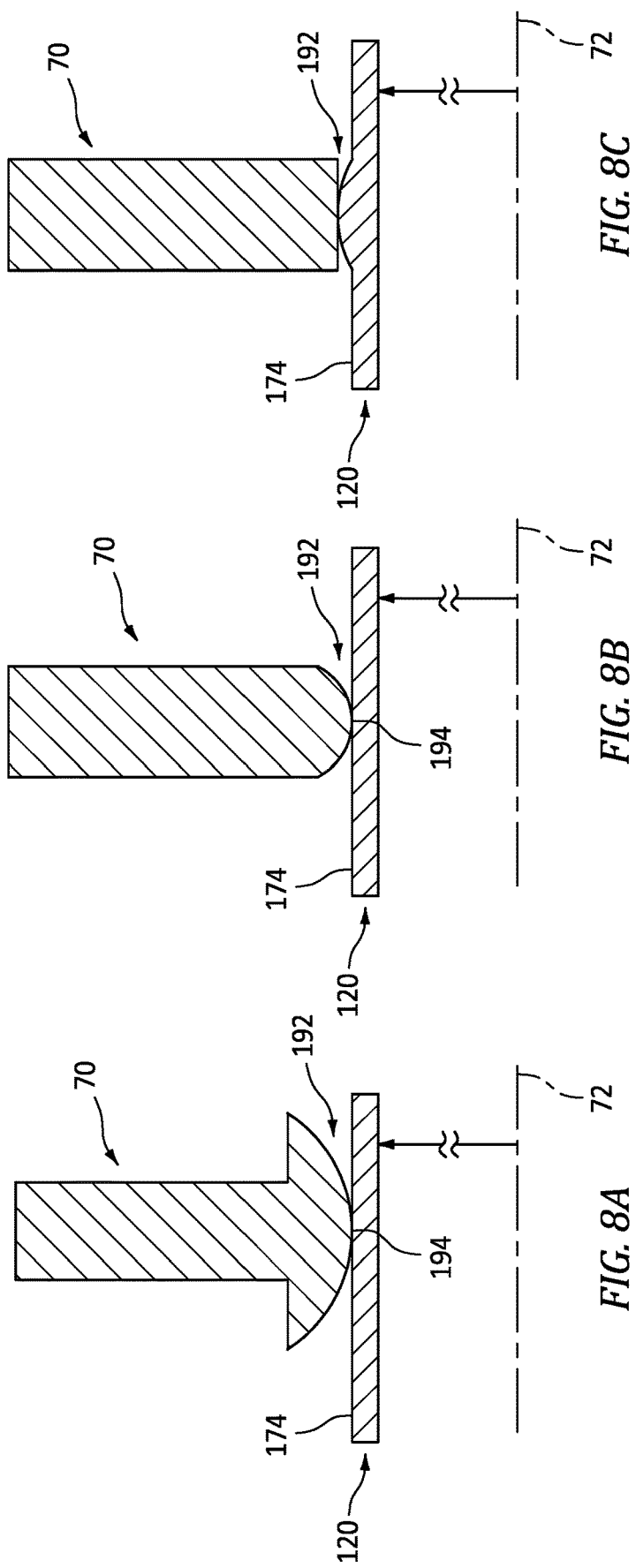

TURBINE ENGINE FUEL INJECTOR ASSEMBLY WITH ANNULAR FUEL OUTLET

BACKGROUND OF THE DISCLOSURE

1. Technical Field

This disclosure relates generally to a gas turbine engine and, more particularly, to a fuel injector assembly for the gas turbine engine.

2. Background Information

Various types and configurations of fuel injector assemblies are known in the art. Some of these known fuel injector assemblies include an air swirler mated with a fuel injector nozzle. While these known fuel injector assemblies have various advantages, there is still room in the art for improvement.

SUMMARY OF THE DISCLOSURE

According to an aspect of the present disclosure, an apparatus is provided for a turbine engine. This turbine engine apparatus includes a fuel injector nozzle extending axially along an axis to a nozzle tip. The fuel injector nozzle includes an inner fuel passage and an outer fuel passage. The inner fuel passage extends axially within the fuel injector nozzle to an inner passage outlet at the nozzle tip. The inner passage outlet is formed by an inner divergent surface. The inner divergent surface is angularly offset from the axis by a first acute angle. The outer fuel passage extends axially within the fuel injector nozzle to an annular outer passage outlet at the nozzle tip. The annular outer passage outlet is formed by an outer divergent surface. The outer divergent surface is angularly offset from the axis by a second acute angle that is greater than the first acute angle.

According to another aspect of the present disclosure, another apparatus is provided for a turbine engine. This turbine engine apparatus includes a fuel injector nozzle extending axially along an axis to a nozzle tip. The fuel injector nozzle includes an inner fuel passage, an outer fuel passage, an inner divergent surface and an outer divergent surface. The inner fuel passage extends axially within the fuel injector nozzle to an inner passage outlet. The inner divergent surface forms a divergent portion of the inner passage outlet at the nozzle tip. A downstream end of the inner divergent surface is axially upstream of an upstream end of the outer divergent surface along the axis. The outer fuel passage extends axially within the fuel injector nozzle to an annular outer passage outlet. The outer divergent surface forms a divergent portion of the annular outer passage outlet at the nozzle tip.

According to still another aspect of the present disclosure, another apparatus is provided for a turbine engine. This turbine engine apparatus includes a swirler assembly and a fuel injector nozzle. The fuel injector nozzle projects axially along an axis into a bore of the swirler assembly. The fuel injector nozzle includes an inner fuel passage, an outer fuel passage, an inner divergent surface and an outer divergent surface. The inner fuel passage extends axially within the fuel injector nozzle to an inner passage outlet. The inner divergent surface forms a divergent portion of the inner passage outlet. The outer fuel passage extends axially within the fuel injector nozzle to an annular outer passage outlet. The outer divergent surface forms a divergent portion of the annular outer passage outlet. A nozzle guide mounts the fuel injector nozzle to the swirler assembly. The nozzle guide is axially moveable along and radially engaged with an exterior surface of the fuel injector nozzle.

The inner divergent surface may be angularly offset from the axis between thirty degrees and fifty degrees. The outer divergent surface may be angularly offset from the axis by an acute angle greater than sixty degrees.

The apparatus may also include a swirler assembly and a nozzle guide. The nozzle guide may mount the fuel injector nozzle to the swirler assembly. The nozzle guide may be axially moveable along and radially engaged with an exterior surface of the fuel injector nozzle.

The first acute angle may be between thirty degrees and fifty degrees.

The second acute angle may be greater than sixty degrees.

The inner passage outlet may also be formed by an inner throat surface upstream of and that extends axially to the inner divergent surface.

The inner passage outlet may also be formed by an inner convergent surface upstream of and that extends axially to the inner throat surface.

The inner convergent surface may be angularly offset from the axis by an acute inner convergent surface angle that is less than the first acute angle.

The outer passage outlet may also be formed by an outer convergent surface upstream of and that extends axially to the outer divergent surface.

The outer convergent surface may be angularly offset from the axis by an acute outer convergent surface angle that is less than the first acute angle.

The outer passage outlet may also be formed by a frustoconical surface radially inboard of and axially overlapped by the outer convergent surface.

An end surface may extend radially between a downstream end of the inner divergent surface and a downstream end of the frustoconical surface.

The end surface may be angularly offset from the axis by an acute end surface angle that is greater than the first acute angle.

The acute end surface angle may be equal to the second acute angle.

The inner divergent surface may be axially recessed into the fuel injector nozzle from the outer divergent surface.

The fuel injector nozzle may include a cylindrical exterior surface and a frustoconical exterior surface extending axially, in a direction towards the nozzle tip, from a downstream end of the cylindrical exterior surface to a downstream end of the outer divergent surface.

The apparatus may also include a swirler assembly and a nozzle guide mounting the fuel injector nozzle to the swirler assembly. The nozzle guide may be axially moveable along and radially engaged with the cylindrical exterior surface.

The apparatus may also include a swirler assembly with a radial air swirler. The fuel injector nozzle may project axially into a bore of the swirler assembly.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 8A-C are partial side sectional illustrations of the fuel injector assembly with various interfaces between an injector mount and the fuel injector nozzle.

DETAILED DESCRIPTION

Figure 1:
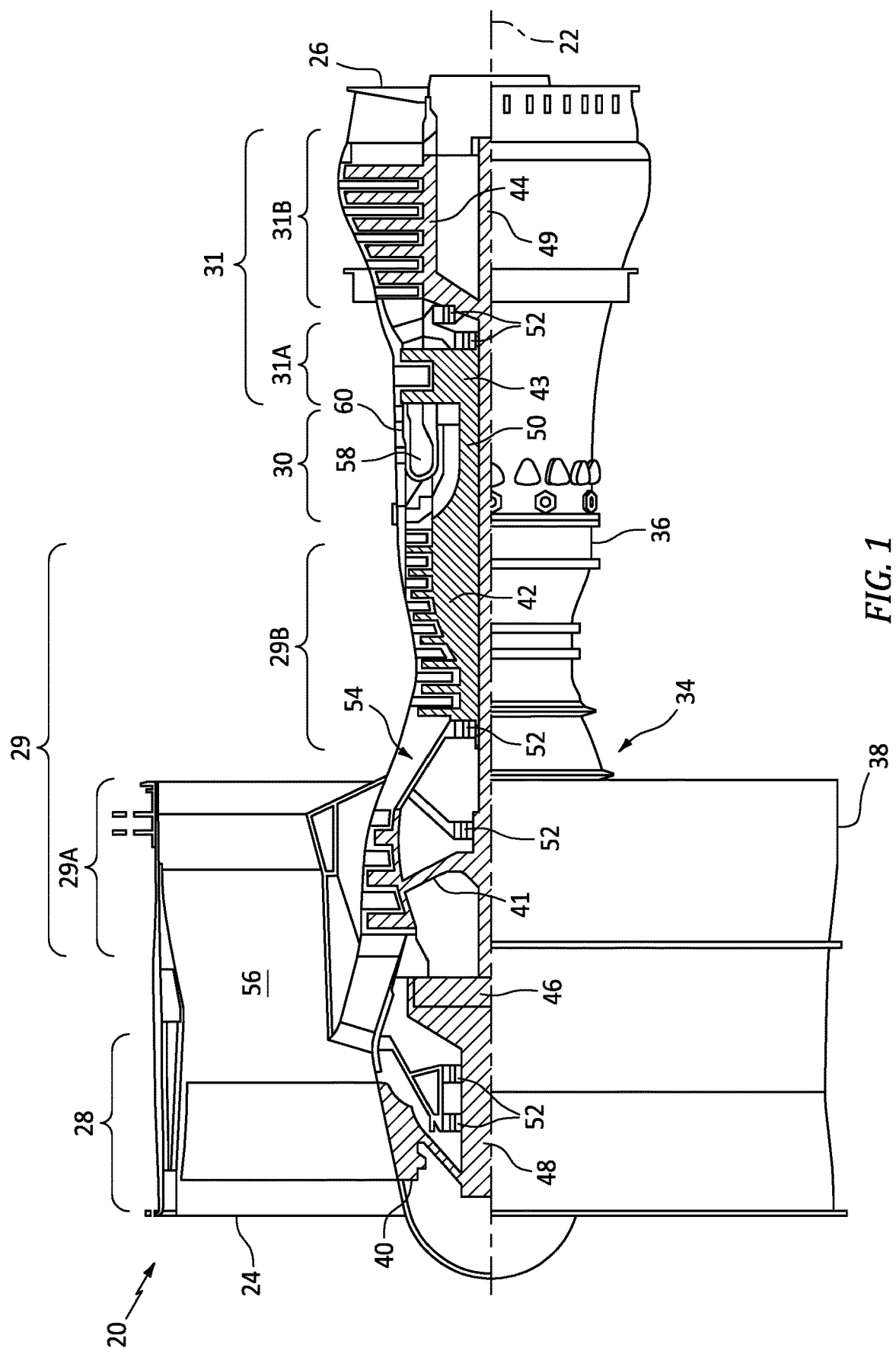
FIG. 1 is a side cutaway illustration of a geared turbine engine.

FIG. 1 is a side cutaway illustration of a geared gas turbine engine 20. This gas turbine engine 20 extends along an axial centerline 22 between an upstream airflow inlet 24 and a downstream airflow exhaust 26. The gas turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31B are arranged sequentially along the axial centerline 22 within an engine housing 34. This engine housing 34 includes an inner case 36 (e.g., a core case) and an outer case 38 (e.g., a fan case). The inner case 36 may house one or more of the engine sections 29A, 29B, 30, 31A and 31B; e.g., a core of the gas turbine engine 20. The outer case 38 may house at least the fan section 28.

Each of the engine sections 28, 29A, 29B, 31A and 31B includes a respective bladed rotor 40-44. Each of these bladed rotors 40-44 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 40 is connected to a geartrain 46, for example, through a fan shaft 48. The geartrain 46 and the LPC rotor 41 are connected to and driven by the LPT rotor 44 through a low speed shaft 49. The HPC rotor 42 is connected to and driven by the HPT rotor 43 through a high speed shaft 50. The engine shafts 48-50 are rotatably supported by a plurality of bearings 52; e.g., rolling element and/or thrust bearings. Each of these bearings 52 is connected to the engine housing 34 by at least one stationary structure such as, for example, an annular support strut.

During engine operation, air enters the gas turbine engine 20 through the airflow inlet 24. This air is directed through the fan section 28 and into a core flowpath 54 and a bypass flowpath 56. The core flowpath 54 extends sequentially through the engine sections 29A-31B; e.g., the engine core. The air within the core flowpath 54 may be referred to as "core air". The bypass flowpath 56 extends through a bypass duct, and bypasses the engine core. The air within the bypass flowpath 56 may be referred to as "bypass air".

The core air is compressed by the LPC rotor 41 and the HPC rotor 42 and directed into a (e.g., annular) combustion chamber 58 of a (e.g., annular) combustor 60 in the combustor section 30. Fuel is injected into the combustion chamber 58 and mixed with the compressed core air to provide a fuel-air mixture. This fuel-air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from an inlet to the core flowpath 54. The rotation of the LPT rotor 44 also drives rotation of the fan rotor 40, which propels bypass air through and out of the bypass flowpath 56. The propulsion of the bypass air may account for a majority of thrust generated by the gas turbine engine 20.

Figure 2:
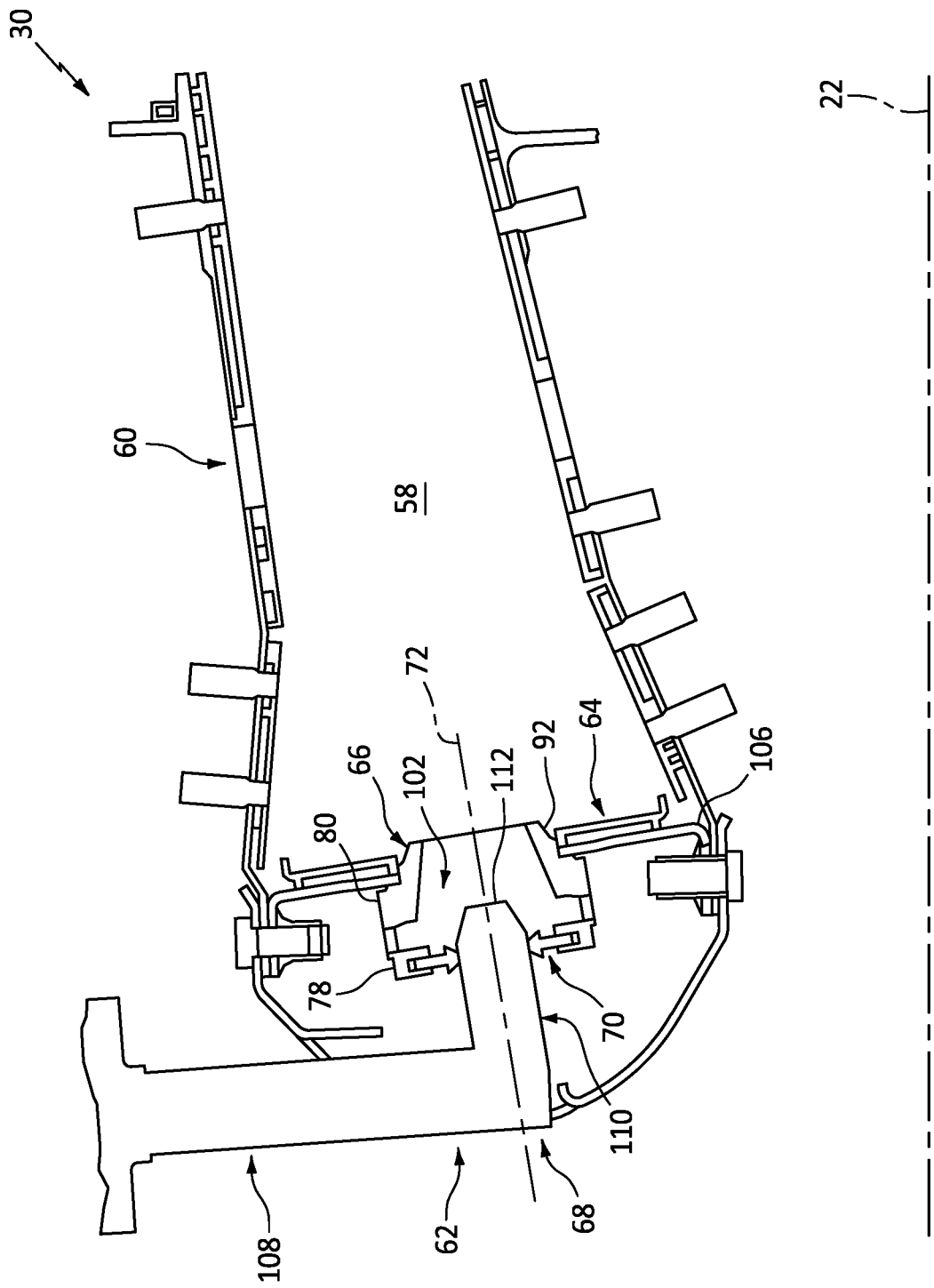
FIG. 2 is a partial side sectional illustration of a combustor with a fuel injector assembly.

Referring to FIG. 2, the combustor section 30 includes a plurality of fuel injector assemblies 62 (one visible in FIG. 2) arranged circumferentially about the axial centerline 22 in a circular array. The fuel injector assemblies 62 are mounted to a (e.g., annular) bulkhead 64 of the combustor 60. The fuel injector assemblies 62 are configured to direct a mixture of fuel and compressed air into the combustion chamber 58 for combustion. Each fuel injector assembly 62 of FIG. 2 includes an air swirler assembly 66 and a fuel injector 68. The fuel injector assembly 62 may also include an injector nozzle guide 70 coupling the fuel injector 68 to the swirler assembly 66.

Figure 3:
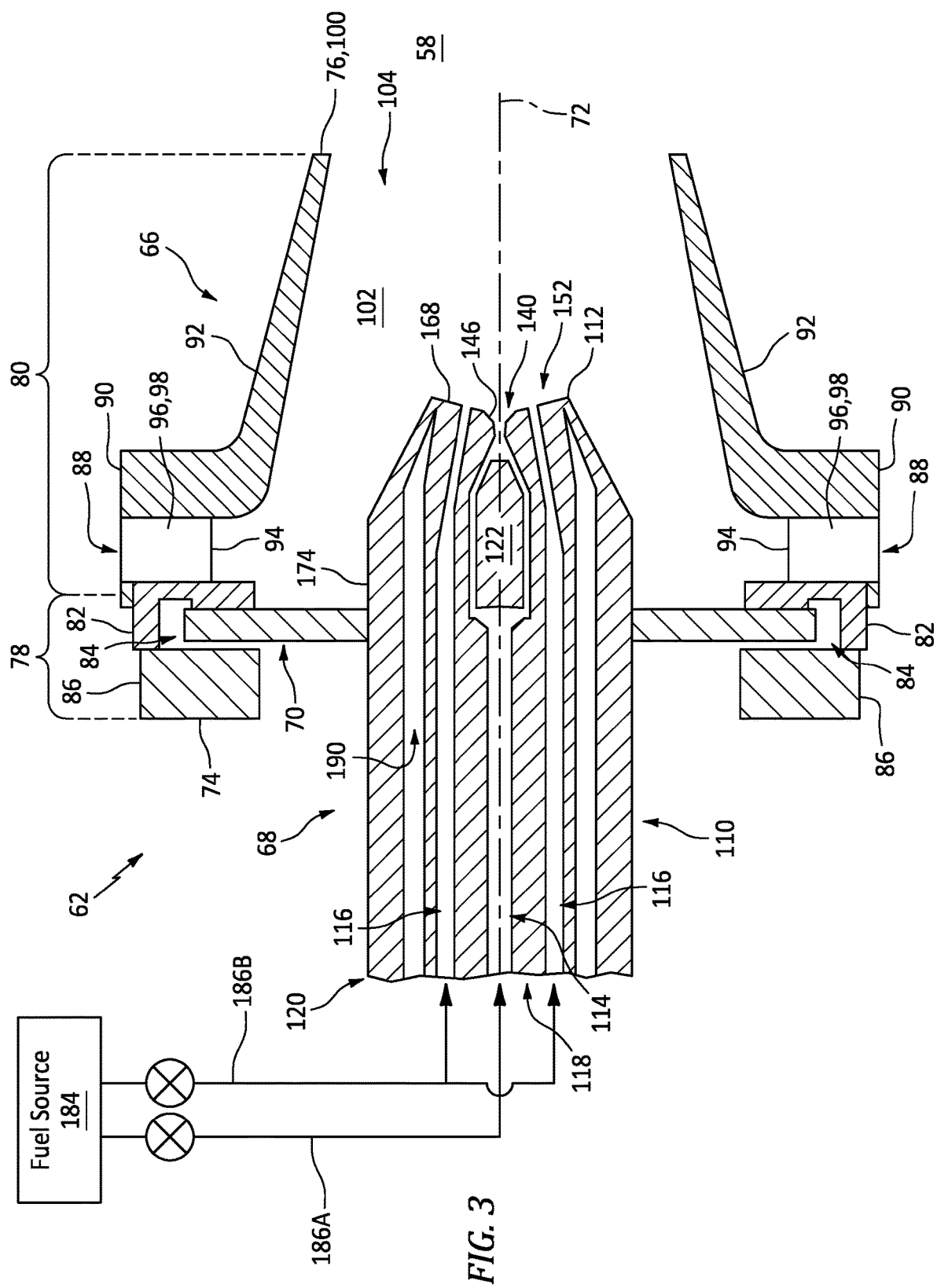
FIG. 3 is a partial side sectional illustration of the fuel injector assembly of FIG. 2.

Referring to FIG. 3, the swirler assembly 66 extends circumferentially around an axis 72 (e.g., a centerline of the swirler assembly 66) providing the swirler assembly 66 with a full-hoop body. The swirler assembly 66 extends axially along the axis 72 from an upstream end 74 of the swirler assembly 66 to a downstream end 76 of the swirler assembly 66. The swirler assembly 66 may include a base section 78 and a swirler section 80.

The base section 78 is disposed at (e.g., on, adjacent or proximate) the swirler upstream end 74. This base section 78 may be configured as or otherwise include a first swirler wall 82; e.g., an annular upstream swirler wall. The base section 78 may also be configured to form a receptacle 84 (e.g., a slot, a channel, etc.) for the nozzle guide 70 at the upstream end 74. The base section 78 of FIG. 3, for example, also includes a mounting plate 86 axially abutted against and attached to the first swirler wall 82. The receptacle 84 is formed at an inner periphery of the base section 78, axially between a (e.g., annular) surface of the first swirler wall 82 and a (e.g., annular) surface of the mounting plate 86. The receptacle 84 is configured to receive the nozzle guide 70, and (e.g., loosely) capture the nozzle guide 70 axially between the first swirler wall 82 and the mounting plate 86. This capturing of the nozzle guide 70 between the first swirler wall 82 and the mounting plate 86 may allow the nozzle guide 70 to radially float (e.g., shift) within the receptacle 84. This floating may in turn accommodate slight shifting between the swirler assembly 66 and the fuel injector 68 during gas turbine engine operation. Of course, various other techniques are known in the art for arranging and/or securing an injector mount with a swirler assembly, and the present disclosure is not limited to any particular ones thereof. Furthermore, it is contemplated the nozzle guide 70 may alternatively be fixed to the swirler assembly 66 where, for example, the swirler assembly 66 is operable to shift relative to the combustor bulkhead 64 (see FIG. 2).

The swirler section 80 includes an air swirler 88 and a second swirler wall 90; e.g., an annular downstream swirler wall. The swirler section 80 of FIG. 3 also includes a swirler guide wall 92; e.g., a tubular funnel wall.

Figure 4:
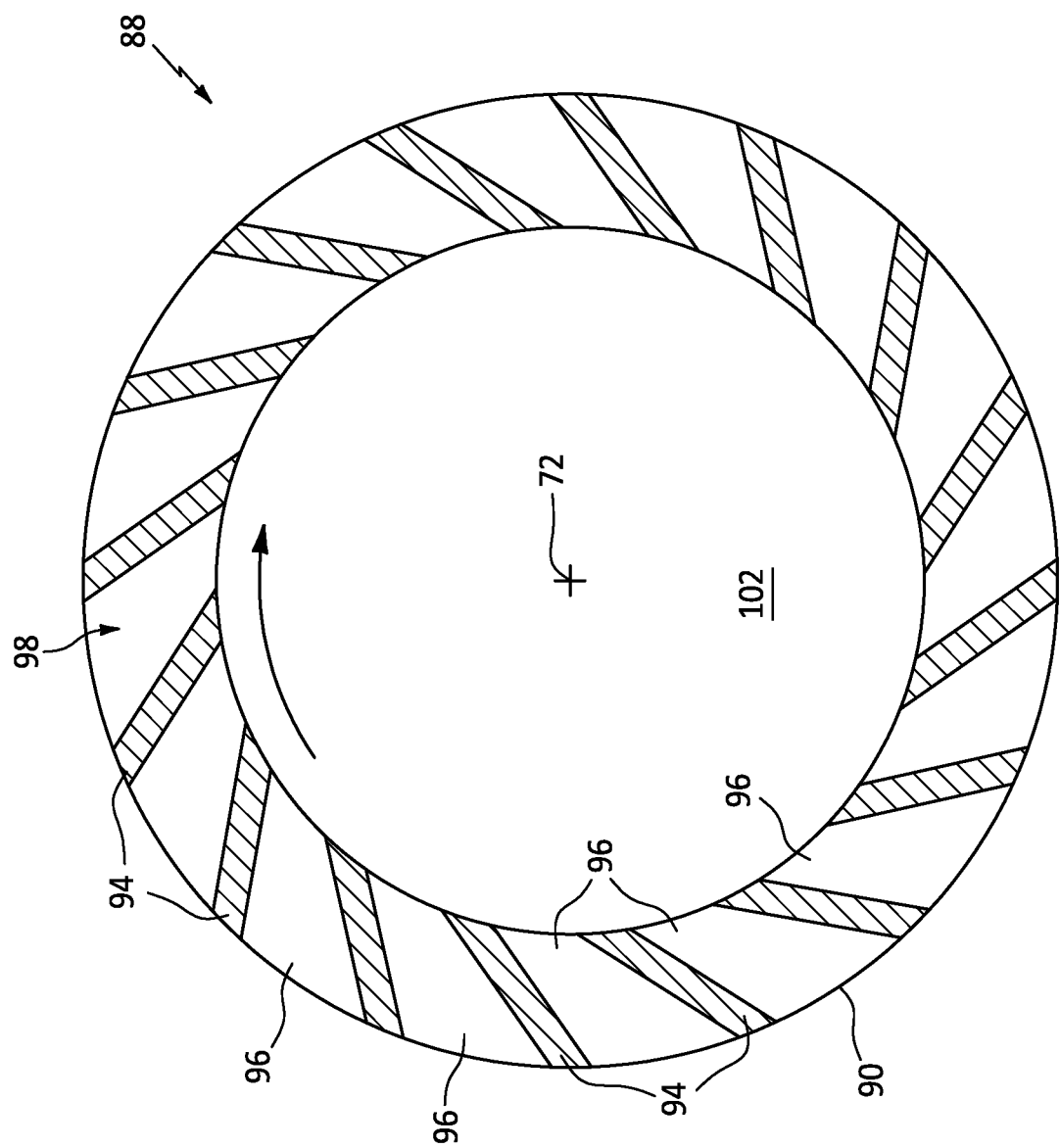
FIG. 4 is a cross-sectional illustration of an air swirler assembly through an air swirler.

The air swirler 88 may be configured as a radial air swirler. The air swirler 88 of FIG. 3, for example, is arranged axially between and is connected to the first swirler wall 82 and the second swirler wall 90. The air swirler 88 of FIG. 4 includes a plurality of air swirler vanes 94. Each of these air swirler vanes 94 extends axially between and is connected to the first swirler wall 82 and the second swirler wall 90 (see FIG. 3). The air swirler vanes 94 are arranged circumferentially about the axis 72 in a circular array. Each of the air swirler vanes 94 is circumferentially separated from each circumferentially neighboring (e.g., adjacent) air swirler vane 94 by a respective air swirler channel 96; e.g., an air gap. Each air swirler channel 96 extends circumferentially between and to a respective circumferentially neighboring pair of the air swirler vanes 94. Each air swirler channel 96 extends axially between and to the first swirler wall 82 and the second swirler wall 90 (see FIG. 3). With this arrangement, the air swirler channels 96 collectively form an air swirler passage 98 radially through the air swirler 88, axially between the swirler walls 82 and 90 (see FIG. 3). The air swirler vanes 94/the air swirler channels 96 are configured such that air passing through and out of the air swirler passage 98 is directed in a first circumferential direction (e.g., a clockwise direction, or alternatively a counterclockwise direction) about the axis 72. In other words, the air swirler vanes 94/the air swirler channels 96 are operable to circumferentially swirl the air passing through the air swirler 88 in the first circumferential direction.

Referring to FIG. 3, the swirler guide wall 92 is disposed at the swirler downstream end 76. The swirler guide wall 92 of FIG. 3, for example, is connected to (and cantilevered from) the second swirler wall 90 at an inner end of the air swirler 88. This swirler guide wall 92 projects out from the second swirler wall 90 and extends axially along the axis 72 to a (e.g., downstream) distal end 100 of the swirler guide wall 92 at the swirler downstream end 76. As the swirler guide wall 92 extends towards (e.g., to) the swirler downstream end 76, the swirler guide wall 92 may (e.g., continuously or incrementally) radially taper inwards towards the axis 72. The swirler guide wall 92 may thereby have a tubular frustoconical geometry.

The swirler assembly 66 of FIG. 3 is further configured with an inner swirler passage 102. This inner swirler passage 102 is formed by an inner bore of the swirler assembly 66. An outer peripheral boundary of an upstream portion of the inner swirler passage 102, for example, may be formed by and radially within the base section 78 and its first swirler wall 82. An outer peripheral boundary of a downstream portion of the inner swirler passage 102 may be formed by and radially within the swirler section 80 and its swirler guide wall 92. The inner swirler passage 102 of FIG. 3 extends axially within the swirler assembly 66 from (or about) a side of the nozzle guide 70 to an inner swirler outlet 104 (e.g., an outlet orifice) at the swirler downstream end 76.

Referring to FIG. 2, the swirler assembly 66 may be mated with the combustor bulkhead 64. The swirler guide wall 92, for example, may project axially into or through a respective port in the combustor bulkhead 64. The swirler assembly 66 may also be mounted to the combustor bulkhead 64. For example, the swirler segment 80 (e.g., the second swirler wall 90 and/or the swirler guide wall 92 of FIG. 3) may be bonded (e.g., brazed or welded) and/or otherwise connected to the combustor bulkhead 64 and, more particularly, a shell 106 of the combustor bulkhead 64. However, various other techniques are known in the art for mounting a swirler assembly to a combustor bulkhead (or various other combustor components), and the present disclosure is not limited to any particular ones thereof.

The fuel injector 68 of FIG. 2 includes a fuel injector stem 108 and a fuel injector nozzle 110. The injector stem 108 is configured to support and route fuel to the injector nozzle 110. The injector nozzle 110 is cantilevered from the injector stem 108. The injector nozzle 110 projects along the axis 72 (e.g., a centerline of the injector nozzle 110) partially into the inner bore of the swirler assembly 66. A tip 112 of the injector nozzle 110 is thereby disposed within the inner swirler passage 102. Here, the nozzle tip 112 is axially spaced from the inner swirler outlet 104 by an axial distance along the axis 72.

Referring to FIG. 3, the injector nozzle 110 is configured with an inner fuel passage 114 and an outer fuel passage 116. The injector nozzle 110 of FIG. 3, for example, includes an inner body 118 and an outer body 120. The injector nozzle 110 may also include a center body 122 disposed within the inner fuel passage 114 axially proximate the nozzle tip 112.

Figure 5:
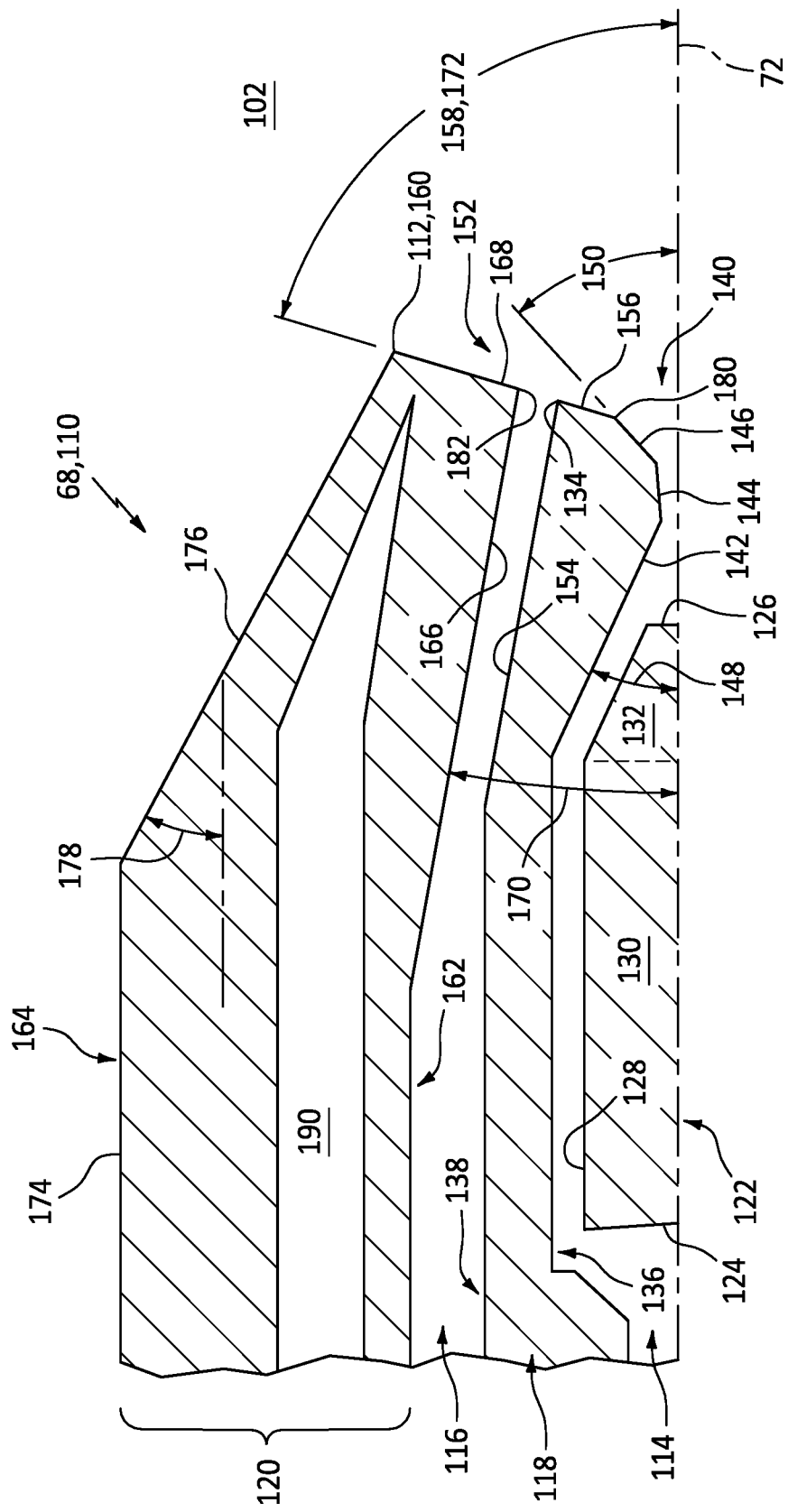
FIG. 5 is a partial side sectional illustration of a fuel injector nozzle.

Referring to FIG. 5, the center body 122 extends axially along the axis 72 between and to an upstream end 124 of the center body 122 and a downstream end 126 of the center body 122. The center body 122 extends radially (e.g., out from the axis 72) to an outer side 128 of the center body 122. A radius of the body outer side 128 along an axial upstream portion 130 of the center body 122 may be uniform; e.g., constant. The radius of the body outer side 128 along an axial downstream portion 132 of the center body 122 may be non-uniform. The radius of the body outer side 128 of FIG. 5, for example, decreases as the axial downstream portion 132 of the center body 122 extends axially along the axis 72 towards (e.g., to) the body downstream end 126. The axial downstream portion 132 of the center body 122 may thereby radially taper as the center body 122 extends axially towards (e.g., to) the body downstream end 126. The present disclosure, however, is not limited to such an exemplary center body configuration. The center body 122, for example, may also or alternatively taper at the body upstream end 124.

The inner body 118 may be configured as an inner tubular member of the injector nozzle 110; e.g., a tubular inner wall. The inner body 118 extends axially along the axis 72 to a distal downstream end 134 of the inner body 118. The inner body downstream end 134 is disposed at (or about) the nozzle tip 112. The inner body downstream end 134 of FIG. 5, for example, is slightly axially recessed into the injector nozzle 110 along the axis 72 from the nozzle tip 112 by a non-zero axial distance. The inner body 118 extends radially between and to an inner side 136 of the inner body 118 and an outer side 138 of the inner body 118. The inner body inner side 136 may form a radial outer peripheral boundary of the inner fuel passage 114 within the injector nozzle 110 and its inner body 118. The inner body outer side 138 may form a radial inner peripheral boundary of the outer fuel passage 116 within the injector nozzle 110 and its outer body 120. The inner body 118 extends circumferentially about (e.g., completely around) the axis 72. The inner body 118 of FIG. 5, in particular, is a full-hoop (e.g., tubular) body which circumscribes and axially overlaps the center body 122.

The inner body 118 forms an outer peripheral boundary of an inner passage outlet 140 (e.g., a full, non-annular outlet) from the inner fuel passage 114 at the nozzle tip 112. This inner passage outlet 140 may be configured as a convergent-divergent nozzle outlet. The inner body 118 of FIG. 5, for example, includes one or more inner body surfaces such as, but not limited to, an inner convergent surface 142, an inner throat surface 144 and an inner divergent surface 146.

The inner convergent surface 142 is disposed axially upstream of the inner throat surface 144 and the inner divergent surface 146. The inner convergent surface 142 may be configured as a tubular frustoconical surface. The inner convergent surface 142, for example, continuously and/or uniformly radially tapers as the inner convergent surface 142 extends axially along the axis 72 from an upstream end of the inner convergent surface 142 (in an axial direction towards the nozzle tip 112) to the inner throat surface 144. The inner convergent surface 142 is thereby angularly offset from the axis 72 by an included angle 148; e.g., a non-zero acute angle. This inner convergent surface angle 148 may be between thirty degrees (30°) and sixty-five degrees (65°). The inner convergent surface 142 extends circumferentially about (e.g., completely around) the axis 72. With this arrangement, the inner convergent surface 142 may form an upstream convergent portion of the inner passage outlet 140.

The inner throat surface 144 is disposed axially between and is adjacent the inner convergent surface 142 and the inner divergent surface 146. The inner throat surface 144 is downstream of the inner convergent surface 142, and upstream of the inner divergent surface 146. The inner throat surface 144 may be configured as a cylindrical surface. The inner throat surface 144, for example, has a uniform (e.g., constant) radius as the inner throat surface 144 extends axially along the axis 72 from the inner convergent surface 142 (in the axial direction towards the nozzle tip 112) to the inner divergent surface 146. The inner throat surface 144 may be radially offset from and parallel with the axis 72. The inner throat surface 144 extends circumferentially about (e.g., completely around) the axis 72. With this arrangement, the inner throat surface 144 may form a throat portion of the inner passage outlet 140.

The inner divergent surface 146 is disposed axially downstream of the inner convergent surface 142 and the inner throat surface 144. The inner divergent surface 146 may be configured as a tubular frustoconical surface. The inner divergent surface 146, for example, continuously and/or uniformly radially tapers as the inner divergent surface 146 extends axially along the axis 72 from the inner body downstream end 134 (in an axial direction away from the nozzle tip 112) to the inner throat surface 144. The inner divergent surface 146 is thereby angularly offset from the axis 72 by an included angle 150; e.g., a non-zero acute angle. This inner divergent surface angle 150 may be greater than (or equal to) the inner convergent surface angle 148. The inner divergent surface angle 150, for example, may be between thirty degrees) (30° and fifty degrees (50°); e.g., between thirty-five degrees (35°) and forty-five degrees (45°). The inner divergent surface 146 extends circumferentially about (e.g., completely around) the axis 72. With this arrangement, the inner divergent surface 146 may form a downstream divergent portion of the inner passage outlet 140.

The inner body 118 forms an inner peripheral boundary of an outer passage outlet 152 (e.g., an annular outlet) from the outer fuel passage 116 at the nozzle tip 112. This outer passage outlet 152 may be configured as an annular convergent-divergent nozzle outlet. The inner body 118 of FIG. 5, for example, includes an outer surface 154 at and along the inner body outer side 138. The inner body 118 of FIG. 5 also includes an annular end surface 156.

The inner body outer surface 154 may be configured as a tubular frustoconical surface. The inner body outer surface 154, for example, continuously and/or uniformly radially tapers as the inner body outer surface 154 extends axially along the axis 72 (in the axial direction towards the nozzle tip 112) to the inner body downstream end 134. The inner body outer surface 154 is thereby angularly offset from the axis 72 by an included angle; e.g., a non-zero acute angle. The inner body outer surface 154 extends circumferentially about (e.g., completely around) the axis 72.

The inner body end surface 156 may be configured as an annular frustoconical surface. The inner body end surface 156, for example, continuously and/or uniformly radially tapers as the inner body end surface 156 extends axially along the axis 72 from a downstream end of the inner body outer surface 154 (in the axial direction away from the nozzle tip 112) to a downstream end of the inner divergent surface 146. The inner body end surface 156 is thereby angularly offset from the axis 72 by an included angle 158; e.g., a non-zero acute angle. This inner body end surface angle 158 may be greater than the inner divergent surface angle 150. The inner body end surface angle 158, for example, may be greater than sixty degrees (60°) and less than ninety degrees (90°); e.g., between seventy degrees (70°) and eight or eighty-five degrees) (80-85°. The inner body end surface 156 extends circumferentially about (e.g., completely around) the axis 72.

The outer body 120 may be configured as an outer tubular member of the injector nozzle 110; e.g., a tubular outer wall. The outer body 120 extends axially along the axis 72 to a distal downstream end 160 of the outer body 120. The outer body downstream end 160 is disposed at (or about) the nozzle tip 112. The outer body downstream end 160 of FIG. 5, for example, is axially aligned with the nozzle tip 112 along the axis 72. The outer body 120 extends radially between and to an inner side 162 of the outer body 120 and an outer side 164 of the outer body 120. The outer body inner side 162 may form a radial outer peripheral boundary of the outer fuel passage 116 within the injector nozzle 110 and its outer body 120. The outer body outer side 164 may form an exterior of the injector nozzle 110 and its outer body 120. The outer body 120 extends circumferentially about (e.g., completely around) the axis 72. The outer body 120 of FIG. 5, in particular, is a full-hoop (e.g., tubular) body which circumscribes and axially overlaps the inner body 118.

The outer body 120 forms an outer peripheral boundary of the outer passage outlet 152. The outer body 120 of FIG. 5, for example, includes one or more outer body surfaces such as, but not limited to, an outer convergent surface 166 and an outer divergent surface 168.

The outer convergent surface 166 is disposed axially upstream of the outer divergent surface 168. The outer convergent surface 166 may be configured as a tubular frustoconical surface. The outer convergent surface 166, for example, continuously and/or uniformly radially tapers as the outer convergent surface 166 extends axially along the axis 72 from an upstream end of the outer convergent surface 166 (in the axial direction towards the nozzle tip 112) to the outer divergent surface 168. The outer convergent surface 166 is thereby angularly offset from the axis 72 by an included angle 170; e.g., a non-zero acute angle. This outer convergent surface angle 170 may be between fifteen degrees (15°) and forty-five degrees) (45°. The outer convergent surface angle 170 may be selected such that the outer convergent surface 166 is parallel with the inner body outer surface 154. However, in other embodiments, the outer convergent surface 166 may be angularly offset from the inner body outer surface 154. The outer convergent surface angle 170 may also or alternatively be smaller than (or equal to) the inner convergent surface angle 148. The outer convergent surface 166 extends circumferentially about (e.g., completely around) the axis 72. With this arrangement, the outer convergent surface 166 may form an upstream convergent portion of the outer passage outlet 152.

The outer divergent surface 168 is disposed axially downstream of the inner convergent surface 142. The outer divergent surface 168 may be configured as a tubular frustoconical surface. The outer divergent surface 168, for example, continuously and/or uniformly radially tapers as the outer divergent surface 168 extends axially along the axis 72 from the outer body downstream end 160 (in an axial direction away from the nozzle tip 112) to the outer convergent surface 166. The outer divergent surface 168 is thereby angularly offset from the axis 72 by an included angle 172; e.g., a non-zero acute angle. This outer divergent surface angle 172 is greater than the outer convergent surface angle 170 and the inner divergent surface angle 150. The outer divergent surface angle 172 may also be equal to (or different than) the inner body end surface angle 158. The outer divergent surface angle 172, for example, may be greater than sixty degrees (60°) and less than ninety degrees (90°); e.g., between seventy degrees (70°) and eight or eighty-five degrees (80-85°). The outer divergent surface 168 extends circumferentially about (e.g., completely around) the axis 72.

The outer body 120 also includes a bearing surface 174 (e.g., a cylindrical surface) and a downstream outer surface 176. The bearing surface 174 is upstream of the outer body outer surface 176. Referring to FIG. 3, the bearing surface 174 is configured to mate with the nozzle guide 70. The injector nozzle 110 and its outer body 120 of FIG. 3, for example, project through a bore of the nozzle guide 70, and the nozzle guide 70 may radially engage (e.g., contact) and may be axially slidable along the outer body 120 and its bearing surface 174. Of course, in other embodiments, it is contemplated a sleeve or other intermediate element may be arranged between the outer body 120 and the nozzle guide 70.

Referring to FIG. 5, the outer body outer surface 176 may be configured as a tubular frustoconical surface. The outer body outer surface 176, for example, continuously and/or uniformly radially tapers as the outer body outer surface 176 extends axially along the axis 72 (in the axial direction towards the nozzle tip 112) to the outer divergent surface 168 and the nozzle tip 112. The outer body outer surface 176 is thereby angularly offset from the axis 72 by an included angle 178; e.g., a non-zero acute angle. This outer body outer surface angle 178 is less than the outer divergent surface angle 172. The outer body outer surface angle 178 may also or alternatively be different (e.g., greater) than or equal to the outer convergent surface angle 170. The outer body outer surface angle 178, for example, may be between fifteen degrees (15°) and forty-five degrees (45°). The outer body outer surface 176 extends circumferentially about (e.g., completely around) the axis 72.

The inner fuel passage 114 extends axially within the injector nozzle 110 to its inner passage outlet 140. The outer fuel passage 116 extends axially within the injector nozzle 110 to its outer passage outlet 152. While both the inner passage outlet 140 and the outer passage outlet 152 are generally located at (e.g., on, adjacent or proximate) the nozzle tip 112, the inner passage outlet 140 may be slightly axially recessed inward into the injector nozzle 110 relative to the outer passage outlet 152. Thus, the radial outer, downstream end 180 of the inner divergent surface 146 may be spaced axially upstream of (or alternatively axially aligned with) a radial inner, upstream end 182 of the outer divergent surface 168. The inner body end surface 156, for example, may be inline with (e.g., an inward extension of) the outer divergent surface 168.

During operation of the fuel injector assembly 62 of FIG. 3, air (e.g., the compressed core air from the HPC section of FIG. 1) is directed into the air swirler passage 98. This air flows radially through the air swirler passage 98 and into the inner swirler passage 102. As the air passes through the air swirler 88 and its air swirler passage 98, the air is swirled in the first circumferential direction (see FIG. 4). The air directed through the air swirler 88 into the inner swirler passage 102 is therefore (or otherwise includes) swirled air. This swirled air is directed axially through the inner swirler passage 102 and is discharged from the swirler assembly 66 through the inner swirler outlet 104.

Fuel is directed into and flows axially within the inner fuel passage 114 to the inner passage outlet 140. The fuel is directed out of the injector nozzle 110 through the inner passage outlet 140. This fuel is injected into the inner swirler passage 102 as a hollow inner spray cone. An angle of the inner spray cone is based on (and may be the same as or close to) the inner divergent surface angle 150 (see FIG. 5) of the inner divergent surface 146. This inner spray cone may be provided for various modes of turbine engine operation such as, but not limited to, engine startup and low and/or intermediate power operation.

Fuel is also directed into and flows axially within the outer fuel passage 116 to the outer passage outlet 152. The fuel is directed out of the injector nozzle 110 through the outer passage outlet 152. This fuel is injected into the inner swirler passage 102 as a hollow outer spray cone. An angle of the outer spray cone is based on (and may be the same as or close to) the outer divergent surface angle 172 (see FIG. 5) of the outer divergent surface 168. This outer spray cone flows radially outward and interacts with the swirled air. The swirled outer air may thereby mix with and atomize the fuel from the outer spray cone. This outer spray cone may be provided for various modes of turbine engine operation such as, but not limited to, engine start and low, intermediate and/or high power operation.

By directing the outer spray cone radially outward and into the swirled outer air, high shear fuel mixing and atomization may be improved compared to, for example, a traditional high shear injector with multiple secondary (e.g., outer) fuel jets. Furthermore, providing the outer passage outlet 152 at the nozzle tip 112 may decrease immersion of the injector nozzle 110 and thereby reduce certain tones. Providing the outer passage outlet 152 at the nozzle tip 112 also moves the outer passage outlet 152 closer to the axis 72. Thus, gravity may have a smaller impact on fuel distribution about the axis 72. By contrast, where multiple fuel jets are positioned further out from a nozzle axis (e.g., at an outer periphery of the nozzle), noticeably less fuel may flow to the gravitational top fuel jet(s) than the gravitational bottom fuel jet(s). By providing more uniform fuel distribution about the axis 72 at the outer passage outlet 152, the injector nozzle 110 of the present disclosure may provide improve engine relighting capabilities. Positioning the outer passage outlet 152 proximate the axis 72 also may reduce outer passage outlet size and, thus, pressure drop across the outer fuel passage 116. The fuel injected by the outer passage outlet 152 may also provide a thermal barrier along and protect the nozzle tip 112. In addition, providing more fuel into a central region along the axis 72 may provide improved flame anchoring at a center recirculation zone.

The inner fuel passage 114 and the outer fuel passage 116 may receive the fuel from a common fuel source 184, or alternatively discrete fuel sources. The inner fuel passage 114 and the outer fuel passage 116 of FIG. 3, for example, are each fluidly coupled to the fuel source 184 through a discrete fuel circuit 186A, 186B (generally referred to as "186"). With such an arrangement, fuel flow through each fuel circuit 186 may be adjusted to individually tailor fuel flow to the inner fuel passage 114 and the outer fuel passage 116.

Figure 6:
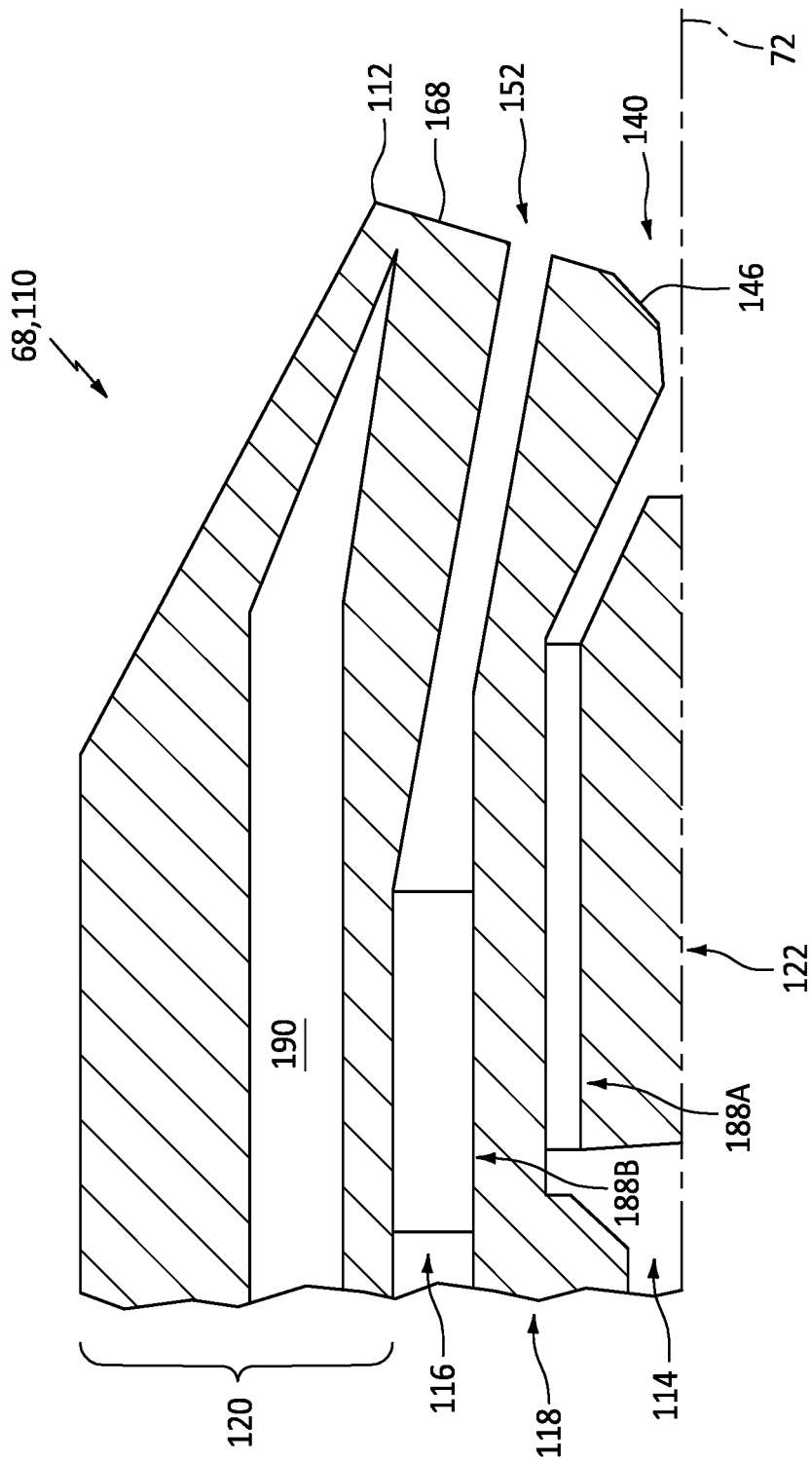
FIG. 6 is a partial side sectional illustration of the fuel injector nozzle with inner passage fuel swirlers.

In some embodiments, referring to FIG. 6, the inner fuel passage 114 and/or the outer fuel passage 116 may each be configured with a fuel swirler 188A, 188B (generally referred to as "188") upstream of the respective passage outlet 140, 152. The fuel swirler 188 is configured to swirler the respective fuel prior to injection through the respective passage outlet 140, 152. Providing such fuel swirlers 188 may facilitate provision of thinner fuel cones and/or increased mixing with the swirled air. Provision of the fuel swirlers 188A, 188B may also facilitate directing the fuel along the respective surface 146, 168 as a thin conical sheet of fuel. These thin conical sheets of fuel may then be blasted by the swirling air and form a respective cone shaped spray of the fuel. To swirl the fuel, each fuel swirler 188 may include an array of vanes and/or channels. The vanes may be straight vanes, curved vanes, threaded vanes or helical vanes. The channels may be formed by slots or angled holes. The fuel swirlers 188A and 188B may be configured as co-rotating or counter rotating swirlers such that the fuel passing through the fuel swirlers 188A and 188B either swirls in a common (e.g., the same) direction or in opposite directions about the axis 72. Of course, various other types of fuel swirlers are known in the art, and the present disclosure is not limited to any particular types thereof.

In some embodiments, referring to FIGS. 5 and 6, the outer body 120 may include an insulating annulus 190. This annulus 190 may contain gas such as air to provide a radial thermal buffer between the fuel passages 114 and 116 and the exterior of the injector nozzle 110.

Figure 7:
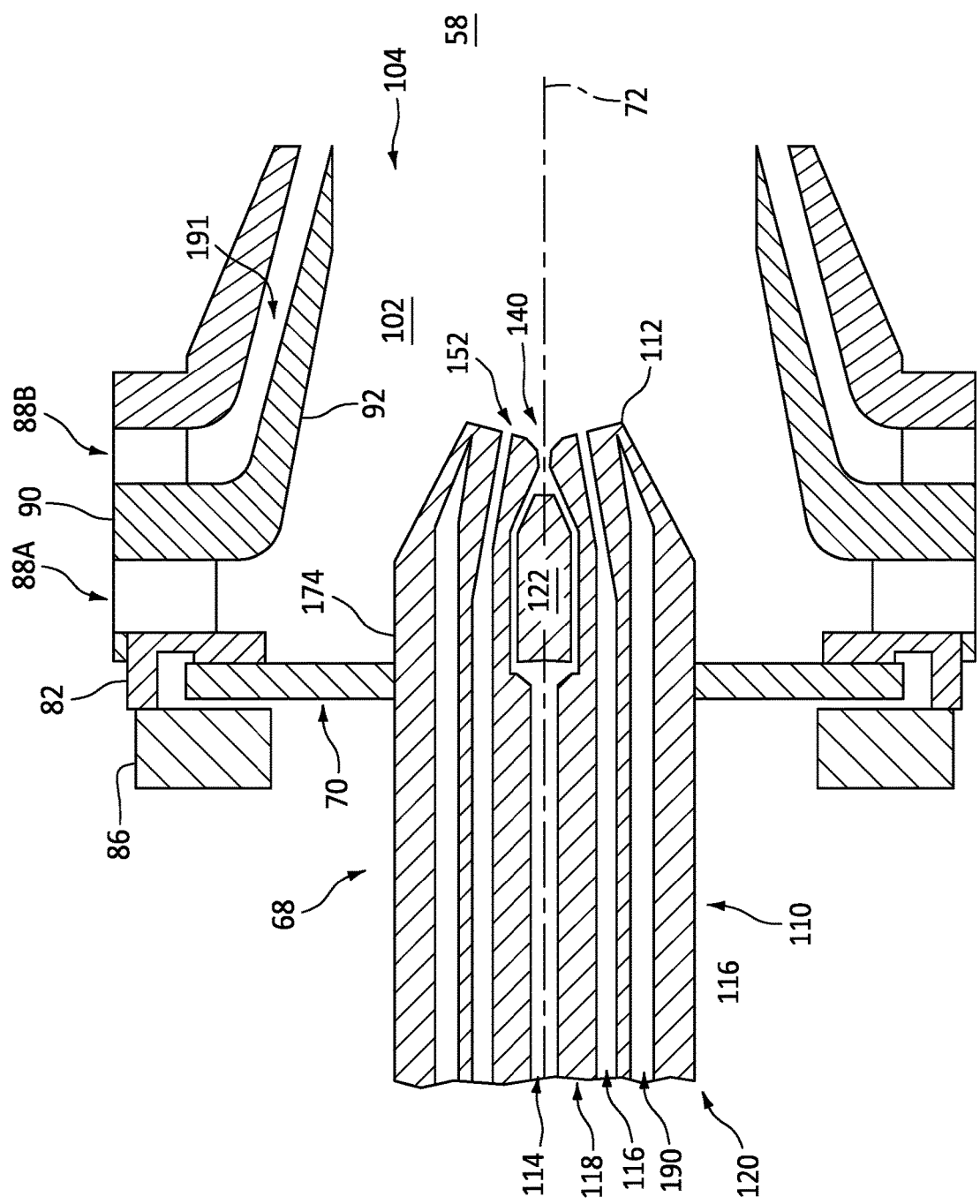
FIG. 7 is a partial side sectional illustration of the fuel injector assembly of FIG. 2 configured with an additional air swirler.

In some embodiments, referring to FIG. 3, the swirler assembly 66 may be configured with a single air swirler 88. In other embodiments, referring to FIG. 7, the air swirler may alternatively be one of a plurality of air swirlers 88A and 88B (generally referred to as "88"). In the embodiment of FIG. 7, the second air swirler 88B may directed swirled air into an outer swirler passage 191 that circumscribes and extends along the swirler guide wall 92. It is contemplated this second air swirler 88B may swirl the air in the first circumferential direction (e.g., a common direction as the first air swirler 88A), or in a second circumferential direction about the axis 72 that is opposite the first circumferential direction.

In some embodiments, referring to FIGS. 8A and 8B, the nozzle guide 70 may be configured with a foot 192 to facilitate axial movement between the nozzle guide 70 and the bearing surface 174. This foot 192 may include a surface 194 with a curved (e.g., arcuate) or otherwise eased sectional geometry when viewed, for example, in a reference plane including or otherwise parallel with the axis 72. In other embodiments, referring to FIG. 8C, the foot 192 may be configured with the outer body 120.

In some embodiments, referring to FIGS. 3 and 7, each air swirler 88 may be configured as a radial air swirler. However, in other embodiments, it is contemplated any one or more of the air swirlers 88 may alternatively be configured as an axial air swirler.

The fuel injector assembly(ies) 62 may be configured to inject a non-hydrocarbon fuel and/or a hydrocarbon fuel. An example of the non-hydrocarbon fuel is hydrogen fuel; e.g., $H_2$ gas. Examples of the hydrocarbon fuel include, but are not limited to, kerosene and jet fuel.

The fuel injector assembly(ies) 62 may be included in various turbine engines other than the one described above. The fuel injector assembly(ies) 62, for example, may be included in a geared turbine engine where a geartrain connects one or more shafts to one or more rotors in a fan section, a compressor section and/or any other engine section. Alternatively, the fuel injector assembly(ies) 62 may be included in a direct drive turbine engine configured without a geartrain. The fuel injector assembly(ies) 62 may be included in a turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a turbine engine, comprising:
a fuel injector nozzle extending axially along an axis to a nozzle tip, the fuel injector nozzle including an inner fuel passage and an outer fuel passage;
the inner fuel passage extending axially within the fuel injector nozzle to an inner passage outlet at the nozzle tip, a portion of the inner fuel passage including an inner convergent surface, the inner convergent surface configured as a frustoconical surface extending around the axis, the inner passage outlet formed by an inner divergent surface, and the inner divergent surface angularly offset from the axis by a first acute angle; and
the outer fuel passage extending axially within the fuel injector nozzle to an annular outer passage outlet at the nozzle tip, the annular outer passage outlet formed by an outer divergent surface, an outer convergent surface and an outer frustoconical surface, the outer convergent surface upstream of and extending axially to the outer divergent surface, the outer frustoconical surface radially inboard of and axially overlapped by the outer convergent surface, and the outer divergent surface angularly offset from the axis by a second acute angle that is greater than the first acute angle;
wherein the inner divergent surface extends to and meets the outer divergent surface at a location forming a downstream end of the inner divergent surface and an upstream end of the outer divergent surface; and
wherein the annular outer passage outlet extends through the outer divergent surface.

2. The apparatus of claim 1, wherein the first acute angle is between thirty-five degrees and forty-five degrees.

3. The apparatus of claim 1, wherein the second acute angle is greater than sixty degrees.

4. The apparatus of claim 1, wherein the inner passage outlet is further formed by an inner throat surface upstream of and that extends axially to the inner divergent surface.

5. The apparatus of claim 4, wherein the inner convergent surface is upstream of and that extends axially to the inner throat surface.

6. The apparatus of claim 5, wherein the inner convergent surface is angularly offset from the axis by an acute inner convergent surface angle that is less than the first acute angle.

7. The apparatus of claim 1, wherein the outer convergent surface is angularly offset from the axis by an acute outer convergent surface angle that is less than the first acute angle.

8. The apparatus of claim 1, wherein an end surface extends radially between the downstream end of the inner divergent surface and a downstream end of the outer frustoconical surface.

9. The apparatus of claim 8, wherein the end surface is angularly offset from the axis by an acute end surface angle that is greater than the first acute angle.

10. The apparatus of claim 9, wherein the acute end surface angle is equal to the second acute angle.

11. The apparatus of claim 1, wherein the inner divergent surface is axially recessed into the fuel injector nozzle from the outer divergent surface.

12. The apparatus of claim 1, wherein the fuel injector nozzle includes
a cylindrical exterior surface; and
a frustoconical exterior surface extending axially, in a direction towards the nozzle tip, from a downstream end of the cylindrical exterior surface to a downstream end of the outer divergent surface.

13. The apparatus of claim 12, further comprising:
a swirler assembly; and
a nozzle guide mounting the fuel injector nozzle to the swirler assembly, the nozzle guide axially moveable along and radially engaged with the cylindrical exterior surface.

14. The apparatus of claim 1, further comprising:
a swirler assembly with a radial air swirler;
the fuel injector nozzle projecting axially into a bore of the swirler assembly.

15. An apparatus for a turbine engine, comprising:
a fuel injector nozzle extending axially along an axis to a nozzle tip, the fuel injector nozzle including an inner fuel passage, an outer fuel passage, an inner divergent surface and an outer divergent surface;
the inner fuel passage extending axially within the fuel injector nozzle to an inner passage outlet, the inner divergent surface forming a divergent portion of the inner passage outlet at the nozzle tip, a downstream end of the inner divergent surface axially upstream of and contacting an upstream end of the outer divergent surface along the axis, and the inner divergent surface angularly offset from the axis between thirty-five degrees and forty-five degrees;
a center body disposed within the inner fuel passage axially proximate the nozzle tip, the center body extending axially within the inner fuel passage from a center body upstream end to a center body downstream end, and the center body extending radially within the inner fuel passage to a center body outer side; and
the outer fuel passage extending axially within the fuel injector nozzle to an annular outer passage outlet, and the outer divergent surface forming a divergent portion of the annular outer passage outlet at the nozzle tip;
wherein the annular outer passage outlet extends through the outer divergent surface.

16. The apparatus of claim 15, wherein the outer divergent surface is angularly offset from the axis by an acute angle greater than sixty degrees.

17. The apparatus of claim 15, further comprising:
a swirler assembly; and
a nozzle guide mounting the fuel injector nozzle to the swirler assembly, the nozzle guide axially moveable along and radially engaged with an exterior surface of the fuel injector nozzle.

18. An apparatus for a turbine engine, comprising:
a swirler assembly;
a fuel injector nozzle projecting axially along an axis into a bore of the swirler assembly, the fuel injector nozzle including an inner fuel passage, an outer fuel passage, an inner divergent surface and an outer divergent surface;
the inner fuel passage extending axially within the fuel injector nozzle to an inner passage outlet, a downstream portion of the inner fuel passage including an inner convergent surface extending circumferentially about a center body disposed within the inner fuel passage, the inner fuel passage circumscribing the center body, and the inner divergent surface forming a divergent portion of the inner passage outlet;
the outer fuel passage extending axially within the fuel injector nozzle to an annular outer passage outlet, and the outer divergent surface forming a divergent portion of the annular outer passage outlet; and
the inner divergent surface extending axially along the axis to the outer divergent surface, and the outer divergent surface projecting axially out from the inner divergent surface; and
a nozzle guide mounting the fuel injector nozzle to the swirler assembly, the nozzle guide axially moveable along and radially engaged with an exterior surface of the fuel injector nozzle;
wherein the annular outer passage outlet extends through the outer divergent surface.

19. The apparatus of claim 18, wherein an inner peripheral boundary of a section of the inner fuel passage is formed by the center body.

* * * * *